US012661807B2

(12) United States Patent (10) Patent No.: US 12,661,807 B2
Qian et al. (45) Date of Patent: Jun. 23, 2026

(54) FLEXIBLE MECHANICAL ARM AND ROBOT

(71) Applicant: WISSON TECHNOLOGY (SHENZHEN) LIMITED, Shenzhen (CN)

(72) Inventors: Zhongfeng Qian, Shenzhen (CN); Ying Wei, Shenzhen (CN); Xiulin Chen, Shenzhen (CN); Beineng Liu, Shenzhen (CN)

(73) Assignee: WISSON TECHNOLOGY (SHENZHEN) LIMITED, Shenzhen (CN)

( * ) Notice: Subject to any disclaimer, the term of this patent is extended or adjusted under 35 U.S.C. 154(b) by 0 days.

(21) Appl. No.: 18/994,278

(22) PCT Filed: Jul. 14, 2023

(86) PCT No.: PCT/CN2023/107553
§ 371 (c)(1),
(2) Date: Jan. 14, 2025

(87) PCT Pub. No.: WO2024/012582
PCT Pub. Date: Jan. 18, 2024

(65) Prior Publication Data
US 2026/0109058 A1 Apr. 23, 2026

(30) Foreign Application Priority Data
Jul. 15, 2022 (CN) .......................... 202210829604.1

(51) Int. Cl.
*B25J 18/06* (2006.01)
*B25J 9/14* (2006.01)
*B25J 18/02* (2006.01)

(52) U.S. Cl.
CPC ............... *B25J 18/06* (2013.01); *B25J 9/146* (2013.01); *B25J 18/025* (2013.01)

(58) Field of Classification Search
CPC . B25J 18/06; B25J 9/146; B25J 18/025; B25J 17/0241
See application file for complete search history.

(56) References Cited

U.S. PATENT DOCUMENTS 3,682,327 A * 8/1972 Winne ..................... B25J 9/101
901/17
5,816,769 A 10/1998 Bauer et al.
(Continued)

FOREIGN PATENT DOCUMENTS

CN 1613618 A 5/2005
CN 1676289 A 10/2005
(Continued)

OTHER PUBLICATIONS

Iwao Hayashi et al., "An In-Pipe Operation Microrobot Driven Based on the Principle of Screw-Development of a Prototype for Running in Long and Bent Pipes," International Symposium on Micromechatronics and Human Science, IEEE, 1997 , pp. 125-129 pages.

(Continued)

*Primary Examiner* — Terence Boes
(74) *Attorney, Agent, or Firm* — KDW Firm PLLC

(57) ABSTRACT

The present disclosure discloses a flexible mechanical arm and a robot. The flexible mechanical arm includes an arm joint, a flexible rotary module (2) and an end execution mechanism (3) which are connected with each other. The flexible rotary module (2) is driven by fluid, and includes a first end plate (23), a powered pusher plate (222), a first folding unit (21), a nut (221), and a lead screw (223) in threaded connection with the nut (221), wherein the first folding unit (21) is driven by fluid to be extended or (Continued)

compressed to push the powered pusher plate (222) to translate in an axial direction of the lead screw (223). The flexible mechanical arm can be deformed under drive of the fluid, thus causing no damage to surrounding objects or persons, and capable of being applied to special environments such as electric fields, magnetic fields, rays, etc.

10 Claims, 8 Drawing Sheets

(56)                    References Cited

U.S. PATENT DOCUMENTS

| 2012/0209314 | A1  | 8/2012  | Weir et al. | |
| 2016/0059410 | A1* | 3/2016  | Staab | B25J 9/142 |
| | | | | 901/22 |
| 2016/0107320 | A1  | 4/2016  | Ji et al. | |
| 2019/0054637 | A1* | 2/2019  | Asada | F16H 21/54 |
| 2020/0147812 | A1  | 5/2020  | Kirkwood et al. | |
| 2023/0249366 | A1* | 8/2023  | Hairsnape | B25J 15/0253 |
| | | | | 700/254 |

FOREIGN PATENT DOCUMENTS

| CN | 101622107 | A | 1/2010 |
| CN | 103452942 | A | 12/2013 |
| CN | 107081744 | A | 8/2017 |
| CN | 107225567 | A | 10/2017 |
| CN | 206610555 | U | 11/2017 |
| CN | 109015619 | A | 12/2018 |
| CN | 110802575 | A | 2/2020 |
| CN | 210551254 | U | 5/2020 |
| CN | 212825375 | U | 3/2021 |
| CN | 112654931 | A | 4/2021 |
| CN | 113084788 | A | 7/2021 |
| CN | 113187956 | A | 7/2021 |
| CN | 113290549 | A | 8/2021 |
| CN | 213954046 | U | 8/2021 |
| CN | 113580190 | A | 11/2021 |
| CN | 215848278 | U | 2/2022 |
| CN | 114603597 | A | 6/2022 |
| CN | 114700935 | A | 7/2022 |
| CN | 217097850 | U | 8/2022 |
| CN | 115091450 | A | 9/2022 |
| CN | 217893232 | U | 11/2022 |
| DE | 102009058653 | A1 | 6/2011 |
| DE | 102011109786 | A1 | 2/2013 |
| DE | 102015214417 | A1 | 2/2017 |
| JP | 2010266016 | A | 11/2010 |

OTHER PUBLICATIONS

Chinese First Office Action for CN Application No. 202210829604. 1, dated Mar. 31, 2023, 22 pages [English Translation Included].
Chinese Second Office Action for CN Application No. 202210829604. 1, dated May 25, 2023, 12 pages [English Translation Included].
Dong Hongbing, "Research On Key Technologies of a Pneumatic Soft Omnidirectional Bending Module," Harbin Institute of Technology, Jun. 2016, 72 pages [English abstract Included].
International Search Report and Written Opinion for International Application No. PCT/CN2023/107553, mailing date Oct. 10, 2023, 17 pages [English Translation Included].

* cited by examiner

FLEXIBLE MECHANICAL ARM AND ROBOT

CROSS-REFERENCE TO RELATED APPLICATIONS

The present application is a national stage filing under 35 U.S.C. 371 of pending International Application No. PCT/CN2023/107553, filed Jul. 14, 2023, which application claims the priority right of a Chinese patent application filed with China Patent Office on Jul. 15, 2022 with an application number of 202210829604.1 and a title of "Flexible Mechanical Arm and Robot", the entire contents of which are hereby incorporated by reference.

TECHNICAL FIELD

The present disclosure relates to flexible mechanical arms and robots.

BACKGROUND

The current mechanical arm mainly adopts the conventional actuation means such as fluid driving by use of motors and rigid structures, which results in large size and heavy weight of the current mechanical arm, and its degree of freedom being limited by the number, specific configuration and combining means of joints, thus having limited movable range, being sensitive to special environmental conditions such as electric field, magnetic field, rays and the like, and being limited in working environment. Further, its rigid structure has poor safety, and tends to cause damage or injury to surrounding objects or persons.

The current flexible arm solutions mostly stay in the laboratory stage, for example, by use of magnetic materials, electric polymers, shape memory materials, etc., but still unable to overcome the defects of limited working environment and small load-to-weight ratio. There may also be means to change the shape of the airbag with gases to drive the mechanical arm to move, but its load-to-weight ratio is still very small.

None of the above mechanical arm solutions, individually or in combination, can simultaneously overcome the above-listed technical defects, such as small load-to-volume ratio, small load-to-weight ratio, poor stability in the movement process and difficulty to accurately control.

SUMMARY

Technical Problem

An objective of the embodiments of the present disclosure is to provide a flexible mechanical arm and a robot.

Content of the Invention

The technical solution adopted by the embodiments of the present disclosure is as follows:

In a first aspect, a flexible mechanical arm is provided, which includes an arm joint, a flexible rotary module and an end execution mechanism connected with each other. The flexible rotary module is connected between a fixed side which is a base or the arm joint of the flexible mechanical arm, and a rotary side which is the arm joint or the end execution mechanism. The flexible rotary module is driven by fluid, and includes a first end plate, a powered pusher plate, a first folding unit connected between the first end plate and the powered pusher plate and driven by fluid to be extended or compressed, a nut fixed to the powered pusher plate, and a lead screw in threaded connection with the nut, wherein the lead screw rotates through the first end plate, and the first folding unit is driven by fluid to be extended or compressed to push the powered pusher plate to translate relative to the first end plate in an axial direction of the lead screw.

In some embodiments, the first end plate is fixedly connected with one of the fixed side or the rotary side, and one or both ends of the lead screw is/are fixedly connected with the other of the fixed side or the rotary side.

In some embodiments, both ends of the lead screw are fixedly connected with one of the fixed side or the rotary side through a connector; the connector includes two connecting support arms and one connecting portion, two ends of the connecting portion are fixedly connected with the two connecting support arms respectively, the two connecting support arms are fixedly connected with the two ends of the lead screw respectively, and the connecting portion is fixedly connected with the fixed side or the rotary side.

In some embodiments, the lead screw is configured to be hollow, an outer periphery of the lead screw is provided with an external thread in threaded connection with the nut, and the external thread is a multi-start trapezoidal thread.

In some embodiments, the arm joint is a flexible bending module, which includes a first plate-shaped member, a second plate-shaped member, a folding unit group disposed between the first plate-shaped member and the second plate-shaped member, and a support structure connecting the first plate-shaped member with the second plate-shaped member, wherein the folding unit group includes at least two second folding units which are driven to be deformed by fluid, with one end of the folding unit group being fastened to the first plate-shaped member, and the other end of the folding unit group being fastened to the second plate-shaped member; the support structure has one end fastened to the first plate-shaped member, and the other end fastened to the second plate-shaped member; and a hinge is provided on the support structure. The hinge is a unidirectional hinge, a ball hinge, a cross hinge or a Hooke hinge.

In some embodiments, the flexible rotary module further includes a second end plate and a booster, wherein the first end plate is fixedly connected with the second end plate, two ends of the booster are connected to the second end plate and the powered pusher plate respectively, and the lead screw rotates through the second end plate; the booster is an elastic member, or the booster is a third folding unit driven by fluid to be extended or compressed, wherein both ends of the third folding unit are fixed to the second end plate and the powered pusher plate respectively, and the third folding unit is driven by fluid to be extended or compressed to push the powered pusher plate to translate between the first end plate and the second end plate in the axial direction of the lead screw.

In some embodiments, the flexible rotary module further includes at least one group of guide assembly, and the guide assembly each includes a first guide and a second guide, wherein the first guide is provided on the first end plate and the second guide is provided on the powered pusher plate; and the first guide and the second guide have fitted portions matching each other in shape, so as to enable the powered pusher plate to move relative to the first end plate in the axial direction parallel to the lead screw.

In some embodiments, one of the first guide and the second guide is a rod parallel with the lead screw, and the other of the first guide and the second guide is a hole fitted over the rod; alternatively, one of the first guide and the second guide is a slot parallel with the lead screw, and the other of the first guide and the second guide is a lug embedded in the slot.

In some embodiments, the first folding unit is a flexible side wall, and the flexible side wall, the first end plate and the powered pusher plate enclose to form a cylindrical cavity with a central axis;

the flexible side wall is designed to include multiple layers of folding structures, each layer of the folding structure has folding surfaces, a crease surface is formed at a connection of the folding surfaces on two adjacent layers, and an included angle between the folding surface and the crease surface adjacent to each other is defined as an intrusion angle $\theta$;

the first folding unit has an initial intrusion angle $\theta_p$ in an initial state, and the intrusion angle $\theta$ varies between 0° and a maximum intrusion angle $\theta_{max}$ during compression or extension of the folding structure, wherein the initial intrusion angle $\theta_p$ and the maximum intrusion angle $\theta_{max}$ of the first folding unit are configured to satisfy the following relationship: $0.6\ \theta_{max}<\theta_p<0.8\ \theta_{max}$;

in the initial state, a distance between two adjacent layers of multiple layers of the crease surfaces is h, and a wall thickness of the flexible side wall is t, wherein h, t and $\theta_p$ are configured to satisfy the following relationship: $0.05\ h/\sin\ \theta_p<t<0.2\ h/\sin\ \theta_p$;

openings are provided on the flexible side wall, the first end plate or the powered pusher plate to allow driving fluid to enter or leave the cavity to change an inside and outside pressure difference of the cavity and make the folding structure compressed or stretched thereby to drive the first end plate and the powered pusher plate to approach or depart from each other, and to shorten or extend the first folding unit.

In a second aspect, a robot is provided, which includes the above-mentioned flexible mechanical arm.

Beneficial Effects

The flexible mechanical arm provided in the embodiment of the present disclosure is beneficial in that: the flexible mechanical arm provided in the present disclosure includes an arm joint, a flexible rotary module and an end execution mechanism connected with each other, wherein the flexible rotary module includes a first folding unit, a powered pusher plate, a nut, a lead screw and a first end plate. The first end plate and the powered pusher plate are fixed to two ends of the first folding unit respectively. The first folding unit is driven by fluid, and then the powered pusher plate is brought into movement together with the nut along the length direction of the lead screw, thus making the lead screw rotated and outputting rotational movement. The flexible rotary module is flexible and can be deformed under drive of the fluid, thus causing no damage to surrounding objects or persons, and capable of being applied to special environments such as electric fields, magnetic fields, rays, etc. Moreover, the flexible mechanical arm in the present disclosure has a large arm load-to-weight ratio and a relatively stable movement process.

The robot provided in the embodiment of the present disclosure is beneficial in that: the robot provided by the present disclosure includes a flexible mechanical arm, wherein the flexible rotary module and the like in the flexible mechanical arm are driven to be deformed by fluid, thus causing no damage to surrounding objects or persons, and capable of being applied to special environments such as electric fields, magnetic fields, rays, etc. Moreover, the flexible mechanical arm in the present disclosure has a large arm load-to-weight ratio and a relatively stable movement process.

BRIEF DESCRIPTION OF THE DRAWINGS

In order to explain the technical solution in the embodiment of the present disclosure more clearly, drawings required for describing the embodiment or exemplary technologies will be briefly introduced below. Obviously, the attached drawings described below are only some examples of the present disclosure. For those skilled in the art, other drawings can also be obtained according to these drawings without paying inventive effort.

Figure 1:
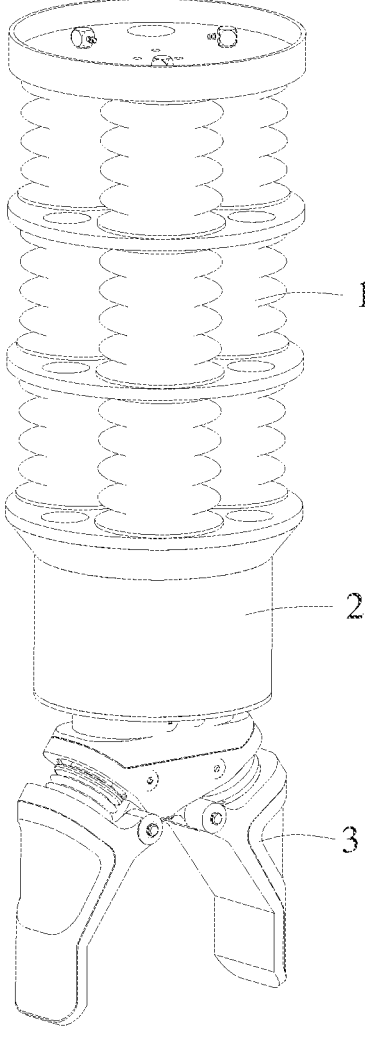
FIG. 1 is a three-dimensional structural view of a flexible mechanical arm provided in an embodiment of the present disclosure.

The reference signs in the figures:
1. flexible bending module; 11. first plate-shaped member; 110. input interface; 111. first rigid unit; 12. second plate-shaped member; 121. second rigid unit; 13. folding unit group; 131. second folding unit; 14. support structure; 141. hinge;
2. flexible rotary module; 21. first folding unit; 221. nut; 222. powered pusher plate; 223. lead screw; 224. guide post; 23. first end plate; 24. second end plate; 241. annular projection; 25. elastic member; 26. outer cylinder; 27. third folding unit; 28. bearing;
3. end execution mechanism; 31. gripper seat; 32. fourth folding unit; 33. gripper body;
4. connector; 41. connecting support arm; 42. connecting portion; 43. extension member; 431. extension rod; 432. U-shaped portion.

DETAILED DESCRIPTION

In order to make the objective, technical solution and advantages of the present disclosure more clear, the present disclosure will be further described in detail with the attached drawings and examples. It should be understood that the specific embodiments described herein are only used to explain the present disclosure rather than limit the present disclosure. In order to make the objective, technical solution and advantages of the present disclosure more clear, the present disclosure will be further described in detail with the attached drawings and examples. It should be understood that the specific embodiments described herein are only used to explain the present disclosure rather than limit the present disclosure.

It should be noted that when a component is referred to be "fixed" or "disposed" on another component, it may be directly or indirectly located on the another component. When a component is referred to be "connected" to another component, it may be connected to the another component directly or indirectly. The azimuth or positional relationship indicated by the terms "up", "down", "left", "right" or the like are based on the attached drawings shown. These words are just for the convenience of description, and do not indicate or imply that the indicated devices or elements must have a specific orientation, or be constructed and operated in a specific orientation, so they shall not be construed as restricting the present disclosure. The specific meanings of the above terms can be understood by those skilled in the art according to specific conditions. The terms "first" and "second" are only used for convenience of description, and shall not be understood as indicating or implying the relative importance or implicitly indicating the number of technical features. The wording "a plurality of" means two or more, unless otherwise specifically defined.

Robots, commonly used at present, as well as their mechanical arms are mostly driven by conventional structures such as motors, rigid transmission assemblies and the like, resulting in that the current mechanical arms have large size, heavy weight and limited movable range, are sensitive to special environmental conditions such as electric field, magnetic field and ray, and thus are limited in working environment. Further, their rigid structures have poor safety, and tend to cause damage or injury to surrounding objects or persons. In order to overcome the above technical problems, the present disclosure provides a flexible mechanical arm and a robot.

In order to explain the technical solution provided by the present disclosure, a detailed explanation will be presented in conjunction with specific drawings and embodiments.

In some embodiments of the present disclosure, a flexible mechanical arm is provided which, with reference to FIG. 1, includes an arm joint, a flexible rotary module 2 and an end execution mechanism 3 connected with each other. The order in which the arm joint, the flexible rotary module 2 and the end execution mechanism 3 are connected is not limited here, so long as the end execution mechanism 3 is located at an end of the flexible mechanical arm. The arm joint may be a flexible arm joint driven to be deformed by fluid or a rigid arm joint driven by electricity or the like. The number of the arm joint may be one or more. The flexible rotary module 2 is driven to be deformed by fluid, and is connected between a fixed side and a rotary side, wherein the fixed side is a base or the arm joint of the flexible mechanical arm, and the rotary side is the arm joint or the end execution mechanism 3. For example, one end of the flexible rotary module 2 is connected to the base, and the other end is connected to the end execution mechanism 3; alternatively, one end of the flexible rotary module 2 is connected to the arm joint, and the other end is connected to the end execution mechanism 3; alternatively, one end of the flexible rotary module 2 is connected to one of the arm joints, and the other end is connected to another arm joint; and alternatively, one end of the flexible rotary module 2 is connected to the base, and the other end is connected to the arm joint.

Figure 2:
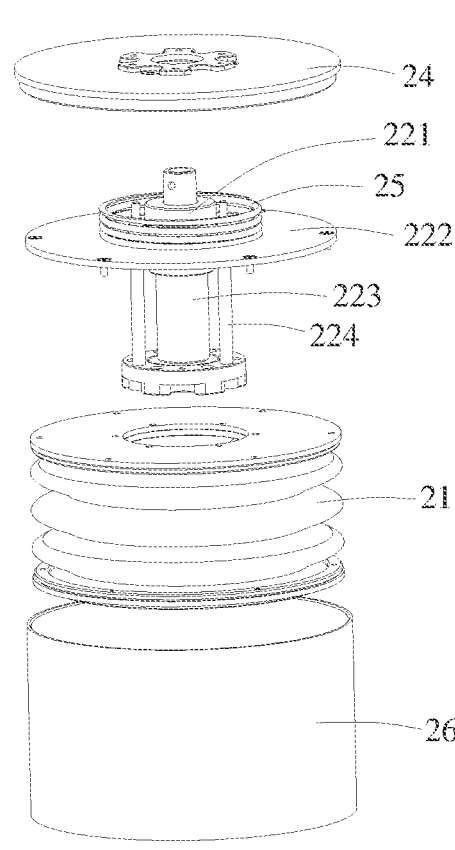
FIG. 2 is an exploded structural view of a flexible rotary module provided in the embodiment of the present disclosure.
Figure 3:
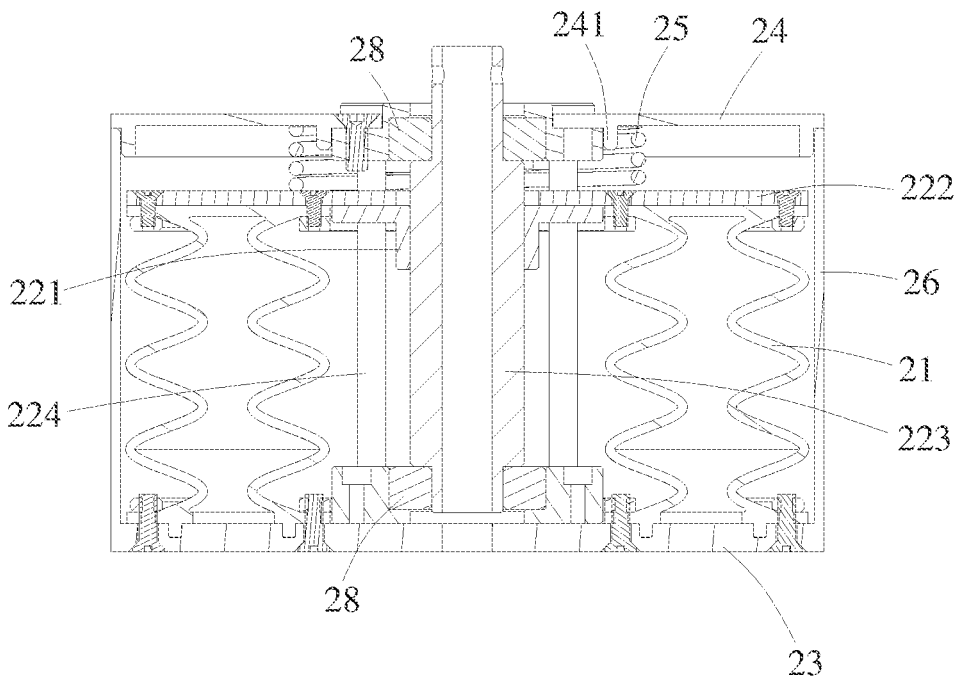
FIG. 3 is a sectional view of the flexible rotary module of FIG. 2.

Referring to FIGS. 2 and 3, the flexible rotary module 2 includes a first folding unit 21, a nut 221, a lead screw 223, a first end plate 23 and a powered pusher plate 222. The first folding unit 21 is driven by fluid to be extended or compressed. Both ends of the first folding unit 21 are fixed to the first end plate 23 and the powered pusher plate 222 respectively, and the nut 221 is also fixed to the powered pusher plate 222. Therefore, when the first folding unit 21 is pushed by fluid to be extended or compressed, the powered pusher plate 222 moves with the extension or compression of the first folding unit 21, and the nut 221 also moves synchronously with the powered pusher plate 222. The nut 221 is in threaded connection with the lead screw 223. Movement of the nut 221 is synchronous with that of the powered pusher plate 222, and the nut 221 only moves linearly in the extension or compression direction of the first folding unit 21 and does not rotate. The lead screw 223 rotates with the linear movement of the nut 221, and a rotational movement is outputted from the lead screw 223.

To be noted, the first folding unit 21 is connected with the first end plate 23 and the powered pusher plate 222 in a sealed manner, so as to prevent leakage of air or water.

Optionally, the first end plate 23 is fixedly connected with one of the fixed side and the rotary side, and an end of the lead screw 223 is fixedly connected with the other of the fixed side and the rotary side. The end of the lead screw 223 is a rotational movement end of the flexible rotary module 2. For example, the first end plate 23 is fixedly connected with the fixed side, and the end of the lead screw 223 is fixedly connected with the rotary side. Alternatively, the first end plate 23 is fixedly connected with the rotary side, and the end of the lead screw 223 is fixedly connected with the fixed side. In this embodiment, the end of the lead screw 223 is one end of the lead screw 223 or both ends of the lead screw 223.

In some embodiments of the present disclosure, referring to FIG. 3, the flexible rotary module 2 further includes a second end plate 24, wherein the first end plate 23 is fixedly connected with the second end plate 23, that is, the relative position between the first end plate 23 and the second end plate 24 is kept unchanged. The two ends of the lead screw 223 are supported on the first end plate 23 and the second end plate 24 and rotate within the first end plate 23 and the second end plate 24 respectively. Specifically, a bearing 28 is provided between the lead screw 223 and the first end plate 23 to make rotation of the lead screw 223 smoother, and a bearing 28 may also be provided between the lead screw 223 and the second end plate 24 to make rotation of the lead screw 223 smoother.

Optionally, the flexible rotary module 2 further includes a booster also used to push the powered pusher plate 222. The booster cooperates with the first folding unit 21, which can make movement of the nut 221 and thus rotation of the lead screw 223 more stable. In addition, in case of being unable to be returned automatically, the first folding unit 21 can be returned through extension or compression of the booster.

In some embodiments, referring to FIG. 3, the booster is an elastic member 25, both ends of which are connected to the second end plate 24 and the powered pusher plate 222 respectively. When fluid stops driving the first folding unit 21, the elastic member 25 may push the powered pusher plate 222 under its own elastic force so as to make the first folding unit 21 returned, thus avoiding the situation of the first folding unit 21 being unable to be returned automatically. The elastic member 25 is optionally a spring, and the elastic member 25 may be fitted over an outer periphery of the lead screw 223. Specifically, the second end plate 24 is provided thereon with an annular protrusion 241, which has a positioning effect on the elastic member 25, and one end of the elastic member 25 may be fitted over the annular protrusion 241.

Optionally, the flexible rotary module 2 further includes an outer cylinder 26, two ends of which are fixed to the first end plate 23 and the second end plate 24 respectively, wherein the first folding unit 21, the powered pusher plate 222, the lead screw 223, the nut 221 and so on are all disposed in the interior of the outer cylinder 26. The outer cylinder 26 can protect the above-mentioned structures, so as to enable the flexible rotary module 2 to work in a harsh environment.

Figure 4:
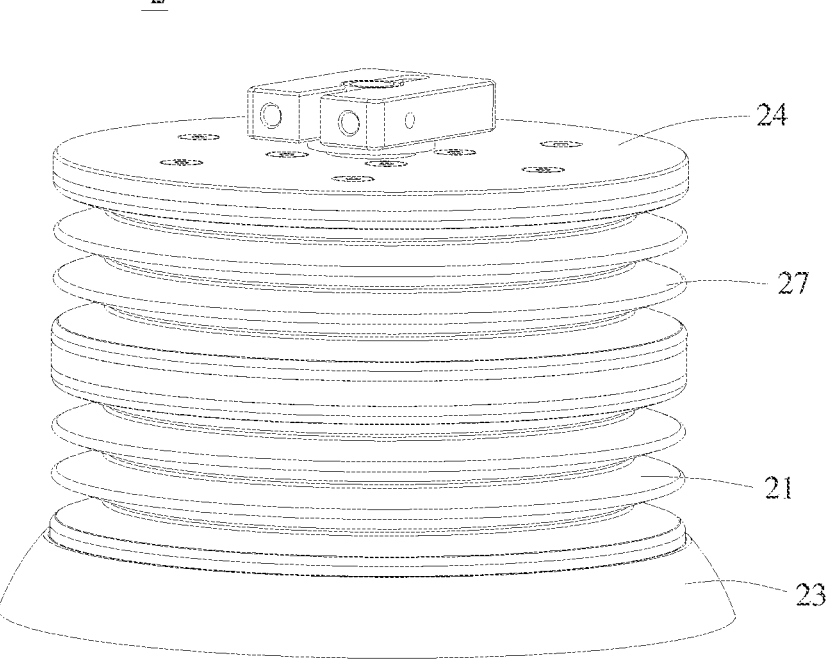
FIG. 4 is an exploded structural view of a second kind of flexible rotary module provided in the embodiment of the present disclosure.
Figure 5:
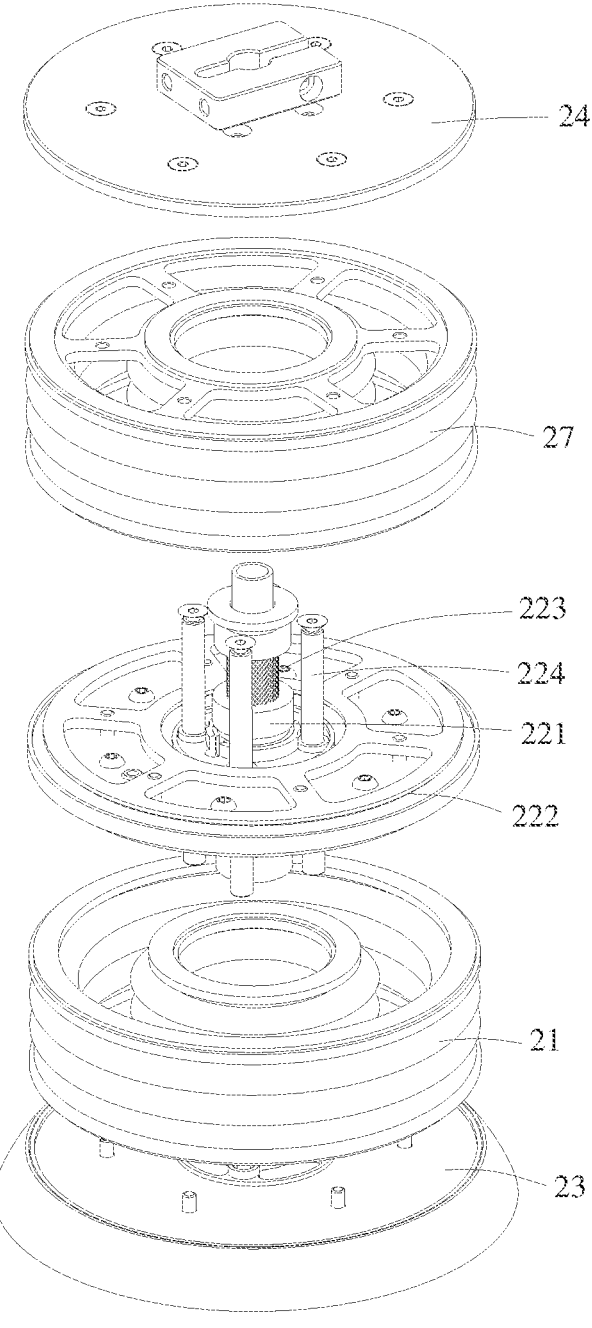
FIG. 5 is an exploded structural view of the flexible rotary module of FIG. 4.
Figure 6:
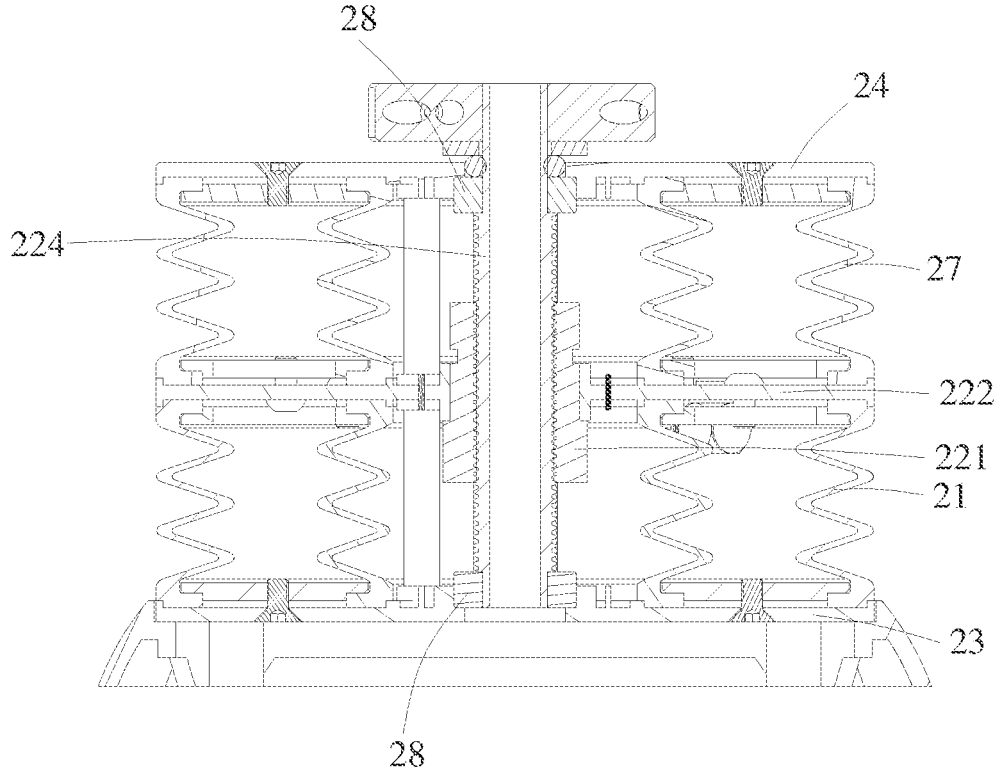
FIG. 6 is a sectional view of the flexible rotary module of FIG. 4.

In some embodiments of the present disclosure, referring to FIGS. 4 to 6, the booster is a third folding unit 27, both ends of which are fixed to the second end plate 24 and the powered pusher plate 222 respectively. The third folding unit 27 is connected with the second end plate 24 and the powered pusher plate 222 in a sealed manner. In this embodiment, the powered pusher plate 222 can move under the action of the first folding unit 21, and can also move under the action of the third folding unit 27. Specifically, the moving speed and moving stroke of the powered pusher plate 222 can be determined under the combined action of the first folding unit 21 and the third folding unit 27, which can make the movement of the nut 221 and further the rotation of the lead screw 223 more stable. Further, in case of the first folding unit 21 being unable to be returned automatically, it can be returned via extension or compression of the third folding unit 27; and in case of the third folding unit 27 being unable to be returned automatically, it can be returned by the first folding unit 21.

The relative positions of the first end plate 23 and the second end plate 24 are fixed, the extension or compression states of the first folding unit 21 and of the third folding unit 27 are complementary, and a sum of the lengths of the first folding unit 21 and the third folding unit 27 remains unchanged. That is, when the first folding unit 21 is extended by L, the third folding unit 27 is shortened by L, and when the first folding unit 21 is shortened by L, the third folding unit 27 is extended by L.

In some embodiments of the present disclosure, the cross sections of the first folding unit 21 and the third folding unit 27 are circular. That is, the first folding unit 21 and the third folding unit 27 include an annular side wall, and the lead screw 223, the guide post 224 and the like may be disposed inside the first folding unit 21 and the third folding unit 27, so as to make the space of the flexible rotary module 2 more compact.

In some embodiments of the present disclosure, referring to FIGS. 3 and 6, the cross sections of the first folding unit 21 and the third folding unit 27 are ring-shaped. That is, the first folding unit 21 and the third folding unit 27 include an inner ring wall and an outer ring wall, and the inner ring wall and the outer ring wall form a space, which is a cavity for containing fluid. The lead screw 223, the guide post 224 and the like may be disposed inside the inner ring wall, so as to make the space of the flexible rotary module 2 more compact.

In some embodiments of the present disclosure, referring to FIG. 1, the flexible rotary module 2 is fixedly connected with the fixed side or the rotary side, that is, the end of the lead screw 223 is fixedly connected with the fixed side or the rotary side. When the flexible rotary module 2 is in operation, the lead screw 223 rotates, thus drive thing end execution mechanism 3 to rotate.

One end of the lead screw 223 extends out of the first end plate 23 or the second end plate 24, and the fixed side or the rotary side is fixedly connected with the extended portion of the lead screw 223 directly. For example, the extended end of the lead screw 223 is connected with the end execution mechanism 3, which has a central axis. When the connection between the lead screw 223 and the end execution mechanism 3 is located on the central axis of the end execution mechanism 3, the end execution mechanism 3 can rotate. In this embodiment, the central axis of the end execution mechanism 3 coincides with the central axis of the lead screw 223, so as to enable the end execution mechanism 3 to rotate. In other embodiments, the central axis of the end execution mechanism 3 may not coincide with the central axis of the lead screw 223, and the rotational central axis of the end execution mechanism 3 is also the central axis of the lead screw 223.

Figure 9:
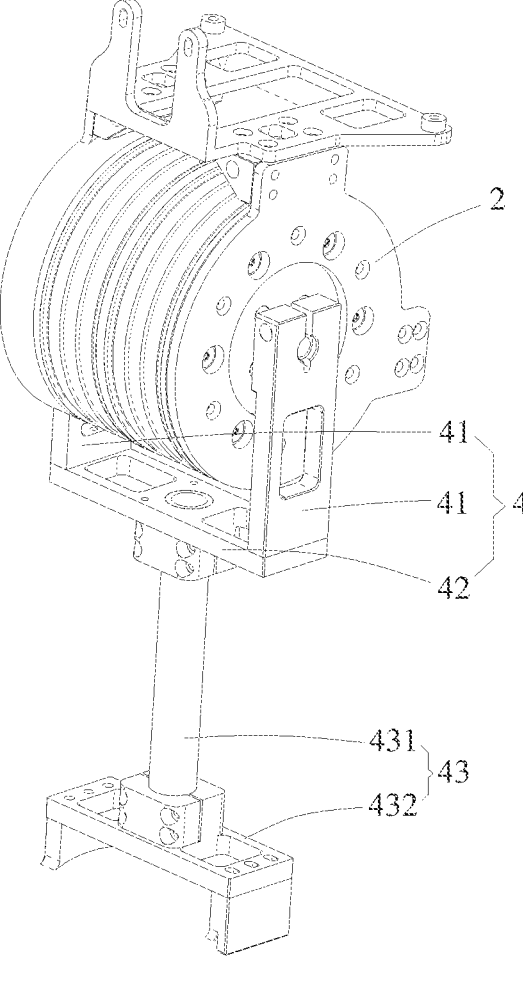
FIG. 9 is a three-dimensional structural view of a connector provided in the embodiment of the present disclosure.
Figure 10:
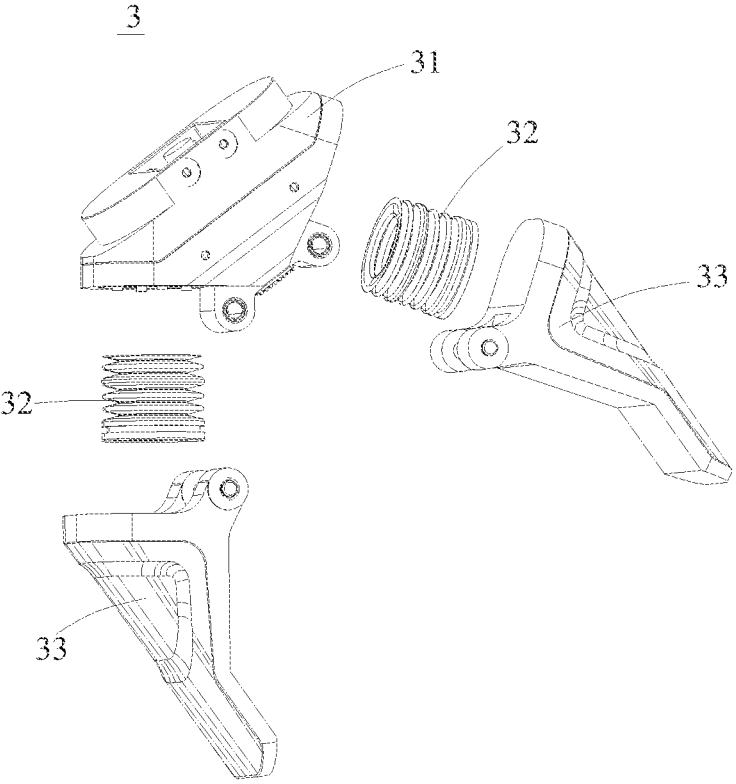
FIG. 10 is an exploded structural view of an end execution mechanism provided in the embodiment of the present disclosure.

In some embodiments of the present disclosure, referring to FIGS. 9 and 10, the flexible rotary module 2 is fixedly connected with the fixed side or the rotary side through the connector 4, that is, the lead screw 223 is fixedly connected with the fixed side or the rotary side through the connector 4. In this way, the position of the arm joint or the end execution mechanism 3 at the rotary side can be more free from restriction. Specifically, the lead screw 223 is fixedly connected with the connector 4, and the fixed side or the rotary side is also fixedly connected with the connector 4, so that the lead screw 223 can drive the end execution mechanism 3 to rotate through the connector 4.

In some embodiments, referring to FIGS. 3 and 9, two ends of the lead screw 223 are both fixedly connected with the connector 4, so that the flexible rotary module 2 can be stressed more uniformly, and the connector 4 is further fixedly connected with the fixed side or the rotary side.

Optionally, the connector 4 includes two connecting support arms 41 and one connecting portion 42, wherein two ends of the connecting portion 42 are fixedly connected with the two connecting support arms 41 respectively, and the two connecting support arms 41 are fixedly connected with the two ends of the lead screw respectively. The two connecting support arms 41 and the one connecting portion 42 may be connected in a U-shape, with the connecting portion 42 being a bottom of the U-shape, thus making the connection between the lead screw 223 and the fixed side or the rotary side more stable.

In some embodiments, one end of the lead screw 223 is fixedly connected with the connector 4. The lead screw 223 is arranged to have one end extended out of the flexible rotary module 2, and the side of the flexible rotary module 2 facing away from the extended end of the lead screw 223 is a supporting side.

Optionally, the lead screw 223 is arranged to have one end extended through the second end plate 24, and an outer side of the first end plate 23 is the supporting side. That is, one end of the lead screw 223 passes through one end of the flexible rotary module 2, and the other end of the flexible rotary module 2 is the supporting side. One end of the connector 4 is connected to the supporting side, the other end of the connector 4 is fixedly connected with the lead screw 223, and the connector 4 is fixedly connected with the fixed side or the rotary side.

Optionally, the lead screw 223 is arranged to have one end extended through the first end plate 23, and an outer side of the second end plate 24 is the supporting side. That is, one end of the lead screw 223 passes through one end of the flexible rotary module 2, and the other end of the flexible rotary module 2 is the supporting side. One end of the connector 4 is connected to the supporting side, the other end of the connector 4 is fixedly connected with the lead screw 223, and the connector 4 is fixedly connected with the fixed side or the rotary side.

Optionally, the connector includes two connecting swing arms and one connecting rod, wherein both ends of the connecting rod are fixedly connected with the two connecting swing arms respectively, so that the connector can be in a U-shaped configuration, with the connecting rod being a bottom of the U-shaped structure. An end of one of the connecting swing arms far away from the connecting rod is rotatably connected with the supporting side, and an end of the other connecting swing arm far away from the connecting rod is fixedly connected with the lead screw 223. In this embodiment, the connector is connected with the flexible rotary module 2 at two positions, namely, at the lead screw 223 and at the supporting side. In this way, when the lead screw 223 drives the connector to rotate, as the two connecting swing arms of the connector are both connected with the flexible rotary module 2, the rotation of the connector can be more stable, and both axial ends of the flexible rotary module 2 can be stressed, thus enabling the flexible rotary module 2 to be stressed more uniformly and to have higher bearing capacity.

In some embodiments of the present disclosure, the flexible mechanical arm includes a plurality of flexible rotary modules 2 which are connected in sequence, wherein the flexible rotary module 2 at the end may be connected with the end execution mechanism 3 through the connector 4, and two adjacent flexible rotary modules 2 are rotatably connected with each other through the connector 4 as well.

Optionally, the connector 4 includes two connecting support arms 41, one connecting portion 42, and an extension member 43, wherein one end of the extension member 43 and the connecting portion 42 are mutually fixed. The arrangement of the extension member 43 can increase the distance between two adjacent flexible rotary modules 2 or the distance between the flexible rotary module 2 and the end execution mechanism 3.

For the connector 4 connecting the flexible rotary module 2 with the end execution mechanism 3, its extension member 43 has one end fixedly connected with the connecting portion 42, and the other end fixedly connected with the end execution mechanism 2. The extension member 43 includes a rod-shaped extension rod 431. The arrangement of the extension member 43 can increase the distance between the flexible rotary module 2 and the end execution mechanism 3.

For the connector 4 connecting two adjacent flexible rotary modules, its extension member 43 has one end fixedly connected with the connecting portion 42, and the other end fixedly connected with the corresponding flexible rotary module 2. The extension member 43 may be in fork-shaped configuration, and includes an extension rod 431 and a U-shaped portion 432. One end of the extension rod 431 is fixedly connected with the connecting portion 42, the other end of the extension rod 431 is fixedly connected with a bottom of the U-shaped portion 432, and two top ends of the U-shaped portion 432 are fixedly connected to two ends (for example, the first end plate and the second end plate) of the corresponding flexible rotary module 2 respectively. In this way, the connecting structure between two flexible rotary modules 2 is more stable and the flexible rotary modules 2 can be stressed more uniformly.

In some embodiments of the present disclosure, referring to FIGS. 3 and 6, the lead screw 223 is configured to be hollow. This on one hand, can endow the lead screw 223 with a light weight, which facilitates to realize lightweight of the flexible mechanical arm, and on the other hand can allow a flow path to pass through the lead screw 223 instead of requiring it to be disposed outside the flexible rotary module 2, thereby capable of keeping the outside of the mechanical arm clean and tidy, and having a protecting effect on the flow path.

In some embodiments of the present disclosure, the outer periphery of the lead screw 223 is provided with an external thread, the nut 221 is provided with an internal thread, and the external thread and the internal thread engage each other, so that when the nut 221 moves along the length direction of the lead screw 223, the lead screw 223 rotates. The external thread on the outer periphery of the lead screw 223 is a multi-start trapezoidal thread, which makes the movement of the nut 332 for driving the lead screw 223 smoother without the phenomenon of self-locking.

When the external thread of the lead screw 223 and the internal thread of the thread engage each other, the axial force of the internal thread onto the external thread drives the lead screw 223 to rotate. Accordingly, different from the general disclosure scenarios such as fastening or using rotational force to drive axial movement, where a small lead angle is needed to reduce the requirement for driving force, the engagement of the nut 221 with the lead screw 223 has an opposite requirement, so it needs to set the lead angle to be a large value. The multi-start thread is more suitable for serving as the external thread on the outer periphery of the lead screw 223 because of its large thread lead angle (easy to slide) for transmitting power and movement.

The thread self-locking condition is that the thread lead angle is less than the equivalent friction angle. In order to prevent self-locking from occurring to the engagement between the lead screw 223 and the nut 221, the trapezoidal thread lead angle of the lead screw 223 shall be greater than the equivalent friction angle, i.e. $\lambda > \arctan(f/\cos \beta)$, where $\arctan(f/\cos \beta)$ is the equivalent friction angle. When the coefficient of static friction between the lead screw 223 and the nut 221 is $f=0.10$, and $\beta=15$, the equivalent friction angle is 5.93, that is, $\lambda > 5.93$, thereby avoiding self-locking of the lead screw 223 and the nut 221, in which $\lambda$ is the thread lead angle, f is a friction coefficient and $\beta$ is a tooth bevel angle.

Optionally, $\lambda$ satisfies the relationship of $30° < \lambda < 50°$, for example, $\lambda$ may be 35°, 40°, 45°, 48°, etc., and further, $40° < \lambda < 50°$. This can enable the nut 221 to drive the lead screw 223 more smoothly to rotate, and less driving force is required. When $\lambda$ is too small, the thread lead angle is excessively small, and the rotation angle of the lead screw 223 is small in case of the nut 221 moving by a unit length; When $\lambda$ is too large, the thread lead angle is excessively large, the resistance against movement of the nut 221 is too large, and a large driving force is required to move the nut 221.

In some embodiments of the present disclosure, the flexible rotary module 2 further includes at least one group of guide assemblies, which are used to assist in movement of the powered pusher plate 222 along the extension and compression direction of the lead screw 223, and prevent the powered pusher plate 222 from being skewed or shaken. The number of the guide assemblies may be selected as one, two, three, etc. A plurality of the guide assemblies can make movement of the powered pusher plate 222 more stable and prevent the powered pusher plate 222 from being shaken during the movement.

Specifically, the guide assembly includes a first guide and a second guide. The first guide is disposed on the first end plate 23, the second guide is disposed on the powered pusher plate 222, and the first guide and the second guide have mated portions matching each other in shape. For example, the first guide is provided with a protruding portion, and the second guide is provided with a grooved portion. In this way, the powered pusher plate 222 can be moved smoothly along the axial direction of the lead screw 223 without being skewed, misaligned or the like.

In some embodiments, the first guide is a rod parallel to the lead screw 223, and the second guide is a hole fitted over the rod. For example, the first guide is a guide post 224, and the second guide is a hole provided in the powered pusher plate 222. The guide post 224 is configured to pass through the hole in the powered pusher plate 222 to prevent the powered pusher plate 222 from moving in a direction perpendicular to the length direction of the guide post 224. Two ends of the guide post 224 are fixed to the first end plate 23 and the second end plate 24 respectively, and the guide post 224 is disposed through the powered pusher plate 222, so that the powered pusher plate 222 only moves along the length direction of the guide post 224. In another embodiment, the second guide is a rod parallel to the lead screw 223, and the second guide is a hole fitted over the rod.

In some embodiments, the first guide is a slot parallel to the lead screw 223, and the second guide is a lug embedded in the slot. For example, the first end plate 23 or other structural members is/are extended with a positioning slot along the axial direction of the lead screw 223, and the powered pusher plate is provided with a lug embedded in the positioning slot, which can also enable the moving direction of the powered pusher plate 222 to be always parallel to the axial direction of the lead screw 223. In another embodiment, the second guide is a slot parallel to the lead screw 223, and the first guide is a lug embedded in the slot.

In some embodiments of the present disclosure, referring to FIG. 1, the arm joint is a flexible bending module 1, which can be bent and deformed under driving of fluid.

Figure 7:
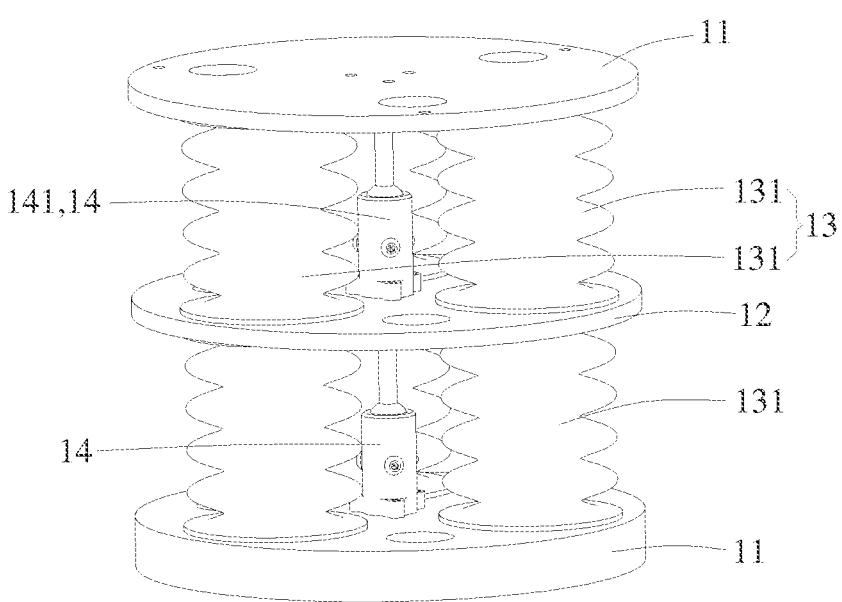
FIG. 7 is a three-dimensional structural view of a first kind of flexible bending module provided in the embodiment of the present disclosure.
Figure 8:
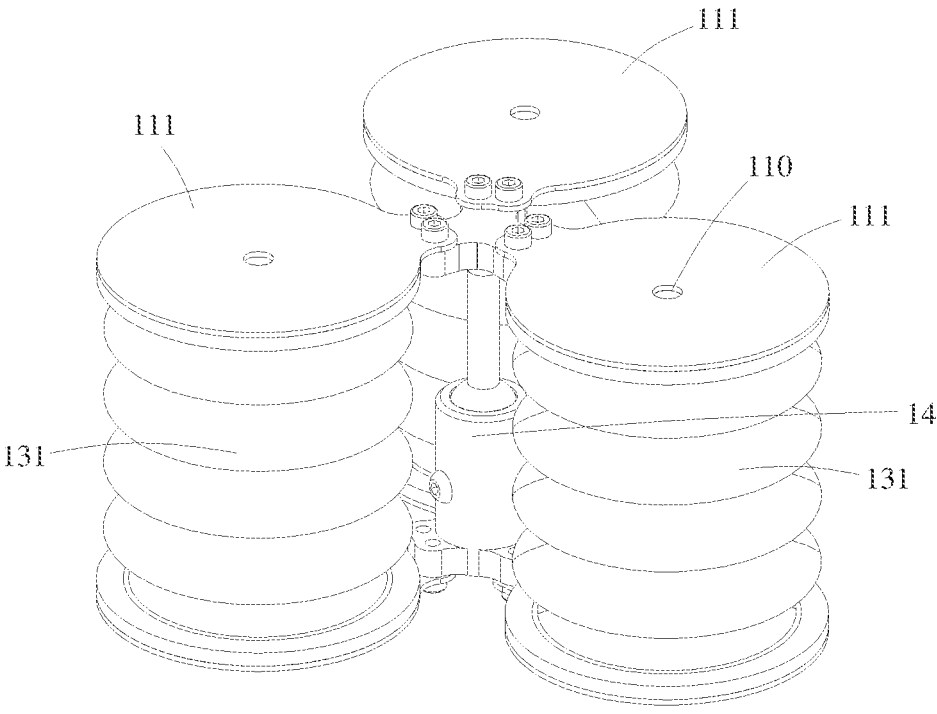
FIG. 8 is a three-dimensional structural view of a second kind of flexible bending module provided in the embodiment of the present disclosure.

Referring to FIGS. 7 and 8, the flexible bending module 1 includes a folding unit group 13, a first plate-shaped member 11, a second plate-shaped member 12 and a support structure 14. The folding unit group 13 is arranged between the first plate-shaped member 11 and the second plate-shaped member 12, and both ends of the folding unit group 13 are fastened to the first plate-shaped member 11 and the second plate-shaped member 12 respectively, so as to improve the rigidity of the flexible bending module 1 and reduce the phenomena such as indentation, collapse, misalignment, disarray and the like of the folding unit group 13 during its deformation. The folding unit group 13 is connected with the first plate-shaped member 11 and the second plate-shaped member 12 both in a sealed manner. The folding unit group 13 includes at least two second folding units 131. The second folding units 131 in the folding unit group 13 are arranged in parallel between the first plate-shaped member 11 and the second plate-shaped member 12, and the second folding units 131 may be the same or may vary in size. The second folding unit 131 is driven to be deformed by fluids such as gas and liquid. For convenience of description, gas driving will be taken as an example for explanation. Gas is inputted into the second folding unit 131; when the air pressure inside the second folding unit 131 is greater than the air pressure outside, the volume of the second folding unit 131 is increased; and when the air pressure inside the second folding unit 131 is less than the air pressure outside, the volume of the second folding unit 131 is decreased. When the air pressure inside each second folding unit 131 is different, the flexible bending module 1 may be bent towards the side of the second folding unit 131 having smaller air pressure, thereby driving the flexible bending module 1 to be bent by fluid.

The first plate-shaped member 11 and the second plate-shaped member 12 are connected through the support structure 14, one end of which is fixed to the first plate-shaped member 11, and the other end of which is fixed to the second plate-shaped member 12. The support structure 14 is provided with a hinge 141. In this way, when the flexible bending module 1 is bent in a certain direction, its movement is more stable. The support structure 14 provides support for the bending movement of the flexible bending module 1, and can improve the lateral rigidity of the second folding unit 131 so as to enable it to have a larger working range and not to collapse due to an excessively large bending angle.

In the above embodiment, the flexible bending module 1 includes a folding unit group 13 consisting of at least two second folding units 131, both ends of the folding unit group 13 are supported by the first plate-shaped member 11 and the second plate-shaped member 12 respectively, and when the pressure inside each second folding unit 131 is inconsistent, the flexible bending module 1 may be bent. Between the first plate-shaped member 11 and the second plate-shaped member 12 is also provided a support structure 14, which has a hinge 141 thereon. The support structure 14 can, on one hand, make the bending action of the mechanical arm more stable, and on the other hand, can improve the lateral rigidity of the mechanical arm, thereby capable of improving the load-to-volume ratio and the load-to-weight ratio of the flexible mechanical arm and preventing collapse and the like of the folding unit group 13.

In some embodiments of the present disclosure, two second folding units 131 and one support structure 14 are provided, and the support structure 14 is disposed at the midpoint of a connecting line between centers of the two second folding units 131. In this way, the flexible bending module 1 has at least two bending directions, that is, being bent towards outer sides of the two second folding units 131, respectively. Moreover, when the flexible bending module 1 is bent towards the two directions, the support structure 14 can well support the second folding units 131, thus reducing the possibility of collapse of the second folding units 131 when deformed. Of course, the support structure 14 may also be placed at other positions, that is, at a position deviating from the above-mentioned midpoint.

In some embodiments of the present disclosure, referring to FIGS. 7 and 8, the number of the second folding units 131 is greater than or equal to three, such as three, four, five, etc. The plurality of second folding units 131 are distributed between the first plate-shaped member 11 and the second plate-shaped member 12 in a ring shape, which can improve the overall rigidity of the flexible bending module 1, and can allow the flexible bending module 1 to be bent in multiple directions. The more bending directions of the flexible bending module 1, the larger the working range of the mechanical claw connected therewith. It should be noted that the ring shape is not necessarily a circular-ring shape.

Optionally, a plurality of the second folding units 131 are distributed at equal intervals along the circumferential direction around a central axis, so that the flexible bending module 1, when bent in each direction, is subjected to substantially the same stress, without the problem of lower strength and rigidity at some place or in some direction.

In some embodiments of the present disclosure, referring to FIGS. 7 and 8, a plurality of the second folding units 131 are arranged between the first plate-shaped member 11 and the second plate-shaped member 12 in a ring shape. A central axis of the circumscribed cylinder of the folding unit group 13 is taken as the central symmetric axis, the number of the support structure 14 is one, and the support structure 14 is disposed at the central symmetric axis. That is to say, the second folding units 131 are in a rotationally symmetric distribution around the central symmetric axis. No matter in which direction the flexible bending module 1 is bent, the support structure 14 can guide the bending of the flexible bending module 1 in cooperation to make the bending movement more stable, and can enhance the lateral rigidity of the second folding units 131 when bent. Of course, the support structure 14 may also be arranged to be offset from the above central symmetric axis.

In some embodiments of the present disclosure, referring to FIG. 7, the first plate-shaped member 11 and the second plate-shaped member 12 are both circular, and each second folding unit 131 has its two ends fixed to the first plate-shaped member 11 and the second plate-shaped member 12 respectively. The centers of circle of the first plate-shaped member 11 and the second plate-shaped member 12 may both be located on the central symmetric axis (the central axis of the circumscribed cylinder of all the second folding units 131), such that the flexible bending module 1 is of a central symmetric structure, the stress of the flexible bending module 1 when bent in each direction is relatively balanced, and the lateral rigidity of each part in the circumferential direction is also approximately the same.

The manner in which the first plate-shaped member 11, the second plate-shaped member 12 and the second folding unit 131 are fixedly connected, is not limited here. For example, they may be fixedly connected together by screws.

In some embodiments of the present disclosure, referring to FIG. 8, the first plate-shaped member 11 includes a plurality of first rigid units 111, all of which are connected to one end of the support structure 14. The second plate-shaped member 12 includes a plurality of second rigid units 121, all of which are connected to the other end of the support structure 14. The numbers of the first rigid units 111, the second rigid units 121 and the second folding units 131 are the same, and each second folding unit 131 has its two ends fixedly connected with the corresponding first rigid units 111 and the second rigid units 121 respectively. Therefore, the distribution of the first rigid unit 111 and the second rigid unit 121 relative to the support structure 14 is the same as that of the second folding units 131 relative to the support structure 14. In this embodiment, under the condition of ensuring the rigidity of the flexible bending module 1, the material consumption of the plate-shaped member is reduced, and the weight of the flexible bending module 1 is reduced, thus further improving the load-to-weight ratio.

In other embodiments, the first plate-shaped member 11 and the second plate-shaped member 12 may be oval, polygonal or the like, and the shapes of the first plate-shaped member 11 and the second plate-shaped member 12 are not limited here.

In some embodiments of the present disclosure, the projection area of the folding unit group 13, in a state of not being driven, in a plane parallel to an end surface of the second folding unit 131 is S1, and a smaller one of projection areas of the minimum enclosing circles of the first plate-shaped member 11 and the second plate-shaped member 12 in the plane parallel to the end surface of the second folding unit 131 is S2. The plane parallel to the end surface of the second folding unit 131 may be referred to as a reference projection plane. Specifically, if the first plate-shaped member 11 and the second plate-shaped member 12 are of the same shape and same size, the projection areas of the minimum enclosing circles of the first plate-shaped member 11 and of the second plate-shaped member 12 on the reference projection plane are both S2; when the projection area of the minimum enclosing circle of the first plate-shaped member 11 on the reference projection plane is larger than that of the minimum enclosing circle of the second plate-shaped member 12 on the reference projection plane, the projection area of the minimum enclosing circle of the second plate-shaped member 12 on the reference projection plane is S2; when the projection area of the minimum enclosing circle of the first plate-shaped member 11 on the reference projection plane is smaller than that of the minimum enclosing circle of the second plate-shaped member 12 on the reference projection plane, the projection area of the minimum enclosing circle of the first plate-shaped member 11 on the reference projection plane is S2. S1 and S2 satisfy the relationship of S1:S2>1:5, which makes the flexible bending module 1 more compact in structure, smaller in volume and lighter in weight. For example, S1:S2 is 0.3, 0.4, 0.5, etc.

In some embodiments of the present disclosure, the hinge 141 is a damping hinge. At the time of the flexible bending module 1 being bent, the damping hinge rotates correspondingly, which increases the friction of the flexible bending module 11 during rotation, makes movement of the flexible bending module 1 more stable and smooth, and prevents the occurrence of shaking.

Optionally, the damping hinge is a damping ball hinge, a damping cross hinge, etc. The damping of the damping hinge is adjustable, and can be adjusted according to the load of the mechanical arm or the like. The damping ball hinge, the damping cross hinge and the like all belong to prior art, and thus will not be described here.

In some embodiments of the present disclosure, the hinge 141 is a ball hinge, a cross hinge, a Hooke hinge or the like.

In some embodiments of the present disclosure, the second folding unit 131 is a folded airbag, and gas or liquid may be inputted into the folded airbag to adjust the pressure inside the folded airbag and change the volume of the folded airbag. The second folding unit 131 is a soft member and may be made of polymer material. The first plate-shaped member 11 or the second plate-shaped member 12 is provided thereon with an input interface 110, through which gas or liquid goes to the interior of the folded airbag. In other embodiments, the input interface 110 may also be provided on the second folding unit 131, through which fluid is inputted.

In some embodiments of the present disclosure, the dimension of the first plate-shaped member 11 and the second plate-shaped member 12 in a direction perpendicular to the end surface of the second folding unit 131 is h, and the diameter of the smaller one of projections of the minimum enclosing circles of the first plate-shaped member 11 and the second plate-shaped member 12 on the plane parallel to the end surface of the second folding unit 131 is D, wherein h:D is less than 1:2, such that the first plate-shaped member 11 and the second plate-shaped member 12 tend to be flat, thus reducing the axial space (in the direction perpendicular to the end surface of the second folding unit 131) occupied by the first plate-shaped member 11 and the second plate-shaped member 12 and realizing miniaturization and lightweight of the flexible bending module 11. Optionally, h:D is 1:3, 1:5, 1:10, etc.

Optionally, the first plate-shaped member 11 and the second plate-shaped member 12 are in the shape of a flat plate, so that the first plate-shaped member 11 and the second plate-shaped member 12 can play a role in enhancing the rigidity of the flexible bending module 1 without occupying too much axial space. At this time, h is the thickness of the first plate-shaped member 11 and the second plate-shaped member 12.

In some embodiments of the present disclosure, the maximum distance between the first plate-shaped member 11 and the second plate-shaped member 12 in the state of being parallel with each other is d, and the diameter of the smaller one of projections of the minimum enclosing circles of the first plate-shaped member 11 and the second plate-shaped member 12 on the reference projection plane is D, wherein d:D is less than 2:1. This can prevent the second folding unit 131 from being extended or compressed by excessive length to result in overall instability of the flexible bending module 1, can prevent the second folding unit 131 from collapse, indentation and so on, and allows more bending modules to be arranged within the unit length of the flexible mechanical arm with the same D value, so as to achieve a larger combined bending range. Optionally, d:D is 3:2, 5:4, 1:1, 4:5, etc.

In some embodiments of the present disclosure, referring to FIG. 1, a plurality, such as two, three or the like, of the flexible bending modules 1 are provided, so as to avoid misalignment, disarray or counteraction of the force, thereby to be capable of maintaining the normal movement of the flexible mechanical arm. In two adjacent flexible bending modules 1, the second plate-shaped member 12 of one of the flexible bending modules 1 is fixedly connected with the first plate-shaped member 11 of its adjacent flexible bending module 1, thereby fixedly connecting the two adjacent flexible bending modules 1 together.

Optionally, in two adjacent flexible bending modules 1, the adjacent first plate-shaped member 11 and second plate-shaped member 12 are fixedly connected through connectors 4 such as screws, or the adjacent first plate-shaped member 11 and second plate-shaped member 12 are integrally formed, or the adjacent first plate-shaped member 11 is the second plate-shaped member 12. In actual processing and assembly, the second folding units 131 distributed in the axial direction only need to be spaced from each other by a plate-shaped member.

In some embodiments of the present disclosure, the first folding unit 21, the second folding unit 131 and the third folding unit 27 are all flexible side walls. The first folding unit 21, the first end plate 23 and the powered pusher plate 222 enclose to form a cylindrical cavity with a central axis, and the third folding unit 27, the second end plate 24 and the powered pusher plate 222 enclose to form a cylindrical cavity with a central axis. The central axes of the cavities of the flexible rotary module 2 are in the same direction as the extension or compression direction of the first folding unit 21 and of the third folding unit 27. The second folding unit 131, the first plate-shaped member 11 and the second plate-shaped member 12 enclose to form a cylindrical cavity with a central axis, and when the flexible bending module 1 is bent, the central axis of the cavity correspondingly assumes a bent state as well.

The cavity formed by the first folding unit 21, the first end plate 23 and the powered pusher plate 222 will be taken as an example for description. Openings are provided in the flexible side wall, the first end plate 23 or the powered pusher plate 222 to allow driving fluid to enter and leave the cavity to change the inside and outside pressure difference of the cavity and make the folding structure compressed or extended thereby to drive the first end plate 23 and the powered pusher plate 222 to approach or depart from each other, and to shorten or extend the first folding unit 21.

The flexible side wall is designed to comprise multiple layers of folding structures. When each layer of the folding structure is folded, the flexible side wall retracts and the volume of the cavity decreases. When each layer of the folding structure is unfolded, the flexible side wall is extended and the volume of the cavity is increased. Each layer of the folding structure has a folding surface, a crease surface is formed at a connection of the folding surfaces on two adjacent layers, and the included angle between the adjacent folding surface and crease surface is defined as an intrusion angle $\theta$. The first folding unit 21 has an initial intrusion angle $\theta_p$ in an initial state, and the intrusion angle $\theta$ varies from 0° to a maximum intrusion angle $\theta_{max}$ during compression or extension of the folding structure. The initial intrusion angle $\theta_p$ and the maximum intrusion angle $\theta_{max}$ of soft muscle may be configured to satisfy the following relationship: $0.6 \, \theta_{max} < \theta_p < 0.8 \, \theta_{max}$.

By the soft muscle provided by the present disclosure, the variation in volume of the cavity is mainly reflected in variation of the dimension in the axial direction, so the volume of the fluid is substantially in linear relationship with parameters related to operation and control such as end surface displacement, or inside and outside pressure difference $\Delta P$ and end surface output force. In addition, possibly, in the folding or unfolding process of the soft muscle, it mainly involves the folding of the folding surface, while the variation in area of the soft muscle itself can be very small. In other words, the energy of the fluid entering the cavity can be mainly used to make the folding structure folded or extended or compressed, so the strain of the folding structure itself can be very small (the strain generated by the folding structure in the deformation process is always within the elastic deformation range of the material and less than 20%, 15%, 10%, 5% or 1%, and is named as small strain for convenience of description). In some embodiments, the internal stress of the folding structure itself may be very small, so only a very small proportion of the mechanical energy of the fluid is used to overcome the stress caused by deformation of the folding structure itself, and most of the mechanical energy is reversibly converted into elastic potential energy in the reciprocating movement of extension and compression of the muscle and released as mechanical energy of the muscle during the variation process in opposite direction, so the soft muscle has high energy conversion efficiency. In some embodiments, during the deformation of the soft muscle, the small strain can be evenly distributed on the whole folding surface, so this soft muscle, compared with other existing soft muscles, can bear or output a larger load, undergo more times of compression and extension, and have a longer service life. In order to control the lateral deviation under high pressure difference, the hardness or modulus of the material for the side wall of the folding unit should be as high as possible, and high modulus-materials tend to have bending resistance. In order to control lateral deformation while taking long serve life and bending resistance into consideration, restrain is made to structures of the folding unit provided by the present disclosure.

In some embodiments, the maximum intrusion angle $\theta_{max}$ may be advantageously configured to satisfy the following relationship: $15° \leq \theta_{max} \leq 60°$.

In some embodiments, the initial intrusion angle $\theta_p$ may be advantageously configured to satisfy the following relationship: $10° < \theta_p < 45°$. Advantageously, setting a favorable initial intrusion angle range can advantageously promote the folding structure of the soft muscle to have less strain and/or more uniform strain distribution during deformation.

In order to generate strain distribution as uniform as possible during the folding deformation of the soft muscle, in some embodiments, in the initial state, the distance between two adjacent layers of multiple layers of the crease surfaces is h, and the wall thickness of the flexible side wall is t. The distance h, the wall thickness t, and the initial intrusion angle $\theta_p$ may be advantageously configured to satisfy the following relationship: $0.05 \, h/\sin \theta_p < t < 0.2 \, h/\sin \theta_p$. Specifically, during the folding deformation of the soft muscle, the wall thickness t of the flexible side wall keeps unchanged.

In the folding structure of the first folding unit 21, the creases formed at connections of the folding surfaces on two adjacent layers of the folding structures are circles with different radii, wherein the radius of the circle at a position protruding in the radial direction of the first folding unit is R, the radius of the circle at a position recessed in the radial direction of the first folding unit is r, the intrusion depth coefficient a of the first folding unit is defined as a=r/R, and $0.3 < a < 0.92$.

In some embodiments, when the cross section of the first folding unit is non-circular, R or r is the shortest distance from a geometric center to an edge of the cross section where the first folding unit is located. For example, when the cross section of the first folding unit is elliptical, R is half of the short axis of the ellipse.

Specifically, the intrusion depth coefficient a can be substantially a constant value during the deformation process of this soft muscle due to its characteristics of small strain. Further, proper setting of the value a can improve the folding deformation performance of the soft muscle according to specific working conditions, for example, in general conditions, the extension-to-compression ratio is to be increased, or in case of the outer-layer side wall of an annular cavity, a is set to be a larger value to obtain a sufficiently large cavity inside the annular cavity. Furthermore, for a soft muscle, its end surface load and environmental pressure jointly determine the range of pressure inside the cavity required for operation. The range of pressure inside the cavity determines the range of the wall thickness t of the flexible side wall. On this basis, in order to make the strain uniformly distributed in further, under the premise that the ranges of a and θ meet the above conditions, the specific values of a and θ are adjusted to get a t/(h*sin θ) ratio within preferred range, with t meeting the requirement of the pressure inside the cavity.

In the folding structure of the second folding unit 131, the creases formed at the connections between the folding surfaces of two adjacent layers of the folding structures are circles with different radii, wherein the radius of the circle at the position protruding in the radial direction of the second folding unit is R, the radius of the circle at the position recessed in the radial direction of the second folding unit is r, the intrusion depth coefficient a of the second folding unit is defined as a=r/R, $0.3 < a < 0.7$, and the structural coefficient σ of the folding surface satisfies $0.02 < \sigma < 0.15$ and $\sigma = \cos \theta (1+a)/(2 \cos \theta - 1 + a)$.

In some embodiments, when the cross section of the second folding unit is non-circular, R is the shortest distance from the geometric center to the edge of the cross section. For example, when the second folding unit is elliptical, R is half of the short axis of the ellipse.

It should be noted that a, R, r and their mutual relationship are used to explain the relative relationship between the folding intrusion depth of the folding unit and the dimension in the cross section, rather than indicate that the cross section of the folding unit must be round or entirely enclosed by arc-shaped edges.

To be explained, the structure composed of the above-mentioned cavities and walls of the cavities may be called the soft muscle. The soft muscle is driven by fluid and may also be referred to as a fluid actuator. The driving process is completed by providing a pressure difference between the cavity of the soft muscle and the external environment to adjust capacity of the fluid in the internal cavity of the soft muscle, thereby changing the volume of the soft muscle, and changing the dimension in the specified direction via variation of the volume, thereby to drive the load in this direction to be displaced.

In order to achieve large-scale adaptive design, manufacture and disclosure on a wide range of disclosure scenarios, the deformation of the soft muscle had better be concentrated in one direction as much as possible via structural design, which can avoid the dissipation of force and energy in non-working directions, and makes it possible to realize accurate control and operation compared with the rigid mechanical arm. For the current soft muscle, its structure and material determine that the surface area and shape of the muscle tend to be changed in the movement process, thus unable to meet the above requirements, so it is difficult to avoid the dissipation of force and energy in the non-working directions, and unable to achieve accurate control and operation.

In order to meet this requirement, the present disclosure provides a soft muscle with different mechanical properties in different directions. The fluid actuator has foldable flexible side walls, so that the fluid actuator can be folded under the action of a small force in the axial direction, but can bear strong force (inside and outside pressure difference of the fluid) in other directions instead of being severely deviated from the axis. Further, via adjustment in structure and material, the fluid actuator can be endowed with the capacity of maintaining its own shape under a large pressure difference, thus bearing a large pressure difference in the lateral direction to have a larger load-to-weight ratio, and having the characteristic of maintaining a stable state in the axial direction by filtering interference forces except for the effective control source.

In some embodiments of the present disclosure, the end execution mechanism 3 may be a flexible gripper, a mechanical gripper, a mesa, a camera module, a sprinkler for fire-fighting or agricultural use, and the like.

In some embodiments of the present disclosure, the end execution mechanism 3 is a flexible gripper. Referring to FIG. 10, the flexible gripper includes a gripper seat 31, a gripper body 33 and a fourth folding unit 32, wherein a plurality of the gripper bodies 33 are provided, and the gripper bodies 33 are rotatably connected with the gripper seat 31. There are also a number of the fourth folding units 32 provided, wherein the number of the fourth folding units 32 is the same as that of the gripper bodies 33. Each fourth folding unit 32 drives the corresponding gripper body 33 to rotate relative to the gripper seat 31.

Specifically, the fourth folding unit 32 is disposed between the gripper seat 31 and the gripper body 33. The fourth folding unit 32 is also driven to be deformed by fluid, and its working principle is the same as that of the first folding unit 131, so the fourth folding unit 32 will not be described in detail here. Two ends of the fourth folding unit 32 may be fixed to the gripper seat 31 and the gripper body 33 respectively and connected with the gripper seat 31 and the gripper body 33 in a sealed manner. When the pressure inside the fourth folding unit 32 is increased, its volume is increased, enabling the gripper bodies 33 to approach each other to pick up an object; while when the pressure inside the fourth folding unit 32 decreases, its volume decreases, so that the gripper bodies 33 depart from each other to put down the object.

The present disclosure also provides a robot, which includes the flexible mechanical arm in any of the above embodiments, and may also include mechanisms such as a flexible telescopic module.

The robot provided by the present disclosure includes a flexible mechanical arm, wherein the flexible rotary module 2 and the like in the flexible mechanical arm are driven to be deformed by fluid, thus causing no damage to surrounding objects or persons, and capable of being applied to special environments such as electric fields, magnetic fields, rays, etc. Moreover, the flexible mechanical arm in the present disclosure has a large arm load-to-weight ratio and a relatively stable movement process.

The above-described embodiments are only optional embodiments of the present disclosure, and are not used to limit this disclosure. Various modifications and variations can be made to the present disclosure for those skilled in the art. Any modification, equivalent substitution, modification, etc. made within the spirit and principle of this disclosure should be included in the scope of claims of the present disclosure.

The invention claimed is:

1. A flexible mechanical arm, comprising an arm joint, a flexible rotary module and an end execution mechanism connected with each other, wherein the flexible rotary module is connected between a fixed side which is a base or the arm joint of the flexible mechanical arm, and a rotary side which is the arm joint or the end execution mechanism; the flexible rotary module is driven by fluid, and comprises a first end plate, a powered pusher plate, a first folding unit connected between the first end plate and the powered pusher plate and driven by fluid to be extended or compressed, a nut fixed to the powered pusher plate, and a lead screw in threaded connection with the nut, wherein the lead screw rotates through the first end plate, and the first folding unit is driven by fluid to be extended or compressed to push the powered pusher plate to translate relative to the first end plate in an axial direction of the lead screw.

2. The flexible mechanical arm according to claim 1, wherein the first end plate is fixedly connected with one of the fixed side or the rotary side, and one or both ends of the lead screw is/are fixedly connected with the other of the fixed side or the rotary side.

3. The flexible mechanical arm according to claim 2, wherein both ends of the lead screw are fixedly connected with one of the fixed side or the rotary side through a connector; the connector comprises two connecting support arms and one connecting portion, two ends of the connecting portion are fixedly connected with the two connecting support arms respectively, the two connecting support arms are fixedly connected with the two ends of the lead screw respectively, and the connecting portion is fixedly connected with the fixed side or the rotary side.

4. The flexible mechanical arm according to claim 1, wherein the lead screw is configured to be hollow, an outer periphery of the lead screw is provided with an external thread in threaded connection with the nut, and the external thread is a multi-start trapezoidal thread.

5. The flexible mechanical arm according to claim 1, wherein that the arm joint is a flexible bending module, which comprises a first plate-shaped member, a second plate-shaped member, a folding unit group disposed between the first plate-shaped member and the second plate-shaped member, and a support structure connecting the first plate-shaped member with the second plate-shaped member, wherein the folding unit group comprises at least two second folding units which are driven to be deformed by fluid, with one end of the folding unit group being fastened to the first plate-shaped member, and the other end of the folding unit group being fastened to the second plate-shaped member; the support structure has one end fastened to the first plate-shaped member, and the other end fastened to the second plate-shaped member; and a hinge is provided on the support structure.

6. The flexible mechanical arm according to claim 1, wherein the flexible rotary module further comprises a second end plate and a booster, wherein the first end plate is fixedly connected with the second end plate, two ends of the booster are connected to the second end plate and the powered pusher plate respectively, and the lead screw rotates through the second end plate; the booster is an elastic member, or the booster is a third folding unit driven by fluid to be extended or compressed, wherein both ends of the third folding unit are fixed to the second end plate and the powered pusher plate respectively, and the third folding unit is driven by fluid to be extended or compressed to push the powered pusher plate to translate between the first end plate and the second end plate in the axial direction of the lead screw.

7. The flexible mechanical arm according to claim 1, wherein the flexible rotary module further comprises at least one group of guide assembly, and the guide assembly each comprises a first guide and a second guide, wherein the first guide is provided on the first end plate and the second guide is provided on the powered pusher plate; and the first guide and the second guide have fitted portions matching each other in shape, so as to enable the powered pusher plate to move relative to the first end plate in the axial direction parallel to the lead screw.

8. The flexible mechanical arm according to claim 7, wherein one of the first guide and the second guide is a rod parallel with the lead screw, and the other of the first guide and the second guide is a hole fitted over the rod; alternatively, one of the first guide and the second guide is a slot parallel with the lead screw, and the other of the first guide and the second guide is a lug embedded in the slot.

9. The flexible mechanical arm according to claim 1, wherein the first folding unit is a flexible side wall, and the flexible side wall, the first end plate and the powered pusher plate enclose to form a cylindrical cavity with a central axis;

the flexible side wall is designed to comprise multiple layers of folding structures, each layer of the folding structure has folding surfaces, a crease surface is formed at a connection of the folding surfaces on two adjacent layers, and an included angle between the folding surface and the crease surface adjacent to each other is defined as an intrusion angle $\theta$;

the first folding unit has an initial intrusion angle $\theta_p$ in an initial state, and the intrusion angle $\theta$ varies between 0° and a maximum intrusion angle $\theta_{max}$ during compression or expansion of the folding structure, wherein the initial intrusion angle $\theta_p$ and the maximum intrusion angle $\theta_{max}$ of the first folding unit are configured to satisfy the following relationship: $0.60\theta_{max} < \theta_p < 0.80\theta_{max}$;

in the initial state, a distance between two adjacent layers of multiple layers of the crease surfaces is h, and a wall thickness of the flexible side wall is t, wherein h, t and $\theta_p$ are configured to satisfy the following relationship:
0.05 h/sin $\theta_p$<t<0.2 h/sin $\theta_p$;

openings are provided on the flexible side wall, the first end plate or the powered pusher plate to allow driving fluid to enter or leave the cavity to change an inside and outside pressure difference of the cavity and make the folding structure compressed or stretched thereby to drive the first end plate and the powered pusher plate to approach or depart from each other, and to shorten or extend the first folding unit.

10. A robot, comprising the flexible mechanical arm according to claim 1.

\*    \*    \*    \*    \*